(12) United States Patent
Daners et al.

(10) Patent No.: US 11,959,457 B2
(45) Date of Patent: Apr. 16, 2024

(54) SERIES OF PLANETARY GEARBOXES, WIND TURBINE, INDUSTRIAL APPLICATION, AND USE OF ROLLING BEARINGS

(71) Applicant: FLENDER GMBH, Bocholt (DE)

(72) Inventors: Dominikus Daners, Herten (DE); Ralf Gettler, Borken (DE); Dirk Holweger, Nuremberg (DE)

(73) Assignee: Flender GmbH, Bocholt (DE)

( * ) Notice: Subject to any disclaimer, the term of this patent is extended or adjusted under 35 U.S.C. 154(b) by 42 days.

(21) Appl. No.: 17/761,073

(22) PCT Filed: Jul. 29, 2020

(86) PCT No.: PCT/EP2020/071363
§ 371 (c)(1),
(2) Date: Mar. 16, 2022

(87) PCT Pub. No.: WO2021/052665
PCT Pub. Date: Mar. 25, 2021

(65) Prior Publication Data
US 2022/0341399 A1 Oct. 27, 2022

(30) Foreign Application Priority Data
Sep. 17, 2019 (EP) .................................. 19197771

(51) Int. Cl.
*F16H 57/08* (2006.01)
*F03D 15/00* (2016.01)
(Continued)

(52) U.S. Cl.
CPC ............ *F03D 15/00* (2016.05); *F03D 80/70* (2016.05); *F16H 1/46* (2013.01); *F16H 57/033* (2013.01);
(Continued)

(58) Field of Classification Search
CPC . F03D 15/00; F03D 80/70; F16H 1/46; F16H 57/033; F16H 57/08;
(Continued)

(56) References Cited

U.S. PATENT DOCUMENTS

2013/0178326 A1 7/2013 Franke et al.
2013/0324354 A1* 12/2013 Phebus ................. F16H 1/2818
475/331
2018/0209512 A1 7/2018 Klein-Hitpass

FOREIGN PATENT DOCUMENTS

CN 102678890 A 9/2012
CN 102678900 A 9/2012
(Continued)

OTHER PUBLICATIONS

Chinese Search Report dated Apr. 18, 2023 by the Chinese Patent Office in Chinese Application No. 2020800653054.
(Continued)

*Primary Examiner* — Justin Holmes
(74) *Attorney, Agent, or Firm* — Henry M. Feiereisen LLC

(57) ABSTRACT

A series of planetary gearboxes includes a plurality of subseries of planetary gearboxes. Each of the plurality of subseries includes a planetary gear carrier of a planetary stage, at least two rolling bearings, and a planetary gear mounted on the at least two rolling bearings. The at least two rolling bearings in a first one of the first plurality of subseries have a first bearing width and in a second one of the first plurality of subseries having a second bearing width.

12 Claims, 7 Drawing Sheets

(51) Int. Cl.
 *F03D 80/70* (2016.01)
 *F16H 1/46* (2006.01)
 *F16H 57/033* (2012.01)

(52) U.S. Cl.
 CPC .......... *F16H 57/08* (2013.01); *F05B 2240/50* (2013.01); *F05B 2260/40311* (2013.01); *F16H 2057/085* (2013.01)

(58) Field of Classification Search
 CPC ............ F16H 2057/085; F05B 2240/50; F05B 2260/40311; Y02E 10/72
 See application file for complete search history.

(56) References Cited

FOREIGN PATENT DOCUMENTS

| | | | |
|---|---|---|---|
| CN | 103511597 | A | 1/2014 |
| CN | 205026063 | | 2/2016 |
| DE | 2809734 | A1 | 9/1979 |
| DE | 100 28 046 | A1 | 12/2001 |
| DE | 102013226520 | A1 * | 6/2015 |
| DE | 102014206109 | A1 | 10/2015 |
| EP | 0504565 | A1 | 9/1992 |
| EP | 2169264 | A1 | 3/2010 |
| EP | 2679867 | A1 * | 1/2014 |
| EP | 2687721 | A2 * | 1/2014 |
| EP | 3351830 | A1 * | 7/2018 |
| EP | 3351830 | A1 | 7/2018 |
| EP | 3364061 | A1 * | 8/2018 |
| JP | 2005-344885 | A | 12/2005 |
| JP | 2011-052788 | A | 3/2011 |
| WO | WO-2013072004 | A1 * | 5/2013 |
| WO | WO 2016074991 | A1 | 5/2016 |

OTHER PUBLICATIONS

Translation of Chinese Search Report dated Apr. 18, 2023 by the Chinese Patent Office in Chinese Application No. 2020800653054.
Wang Maosheng: "Selection of MegawattWind Power Gear Box Planet Carrier bearings", in: Ningxia Machinery 01, Mar. 15, 2011.
International Search Report issued by the European Patent Office in International Application PCT/EP2020/071363.
Schaeffler Technologies "Planetenradlagerungen in Industriegetrieben", Apr. 1, 2012, pp. 1-116.
Skf " SKF General Catalogue", Apr. 30, 1989, pp. 338-338.

* cited by examiner

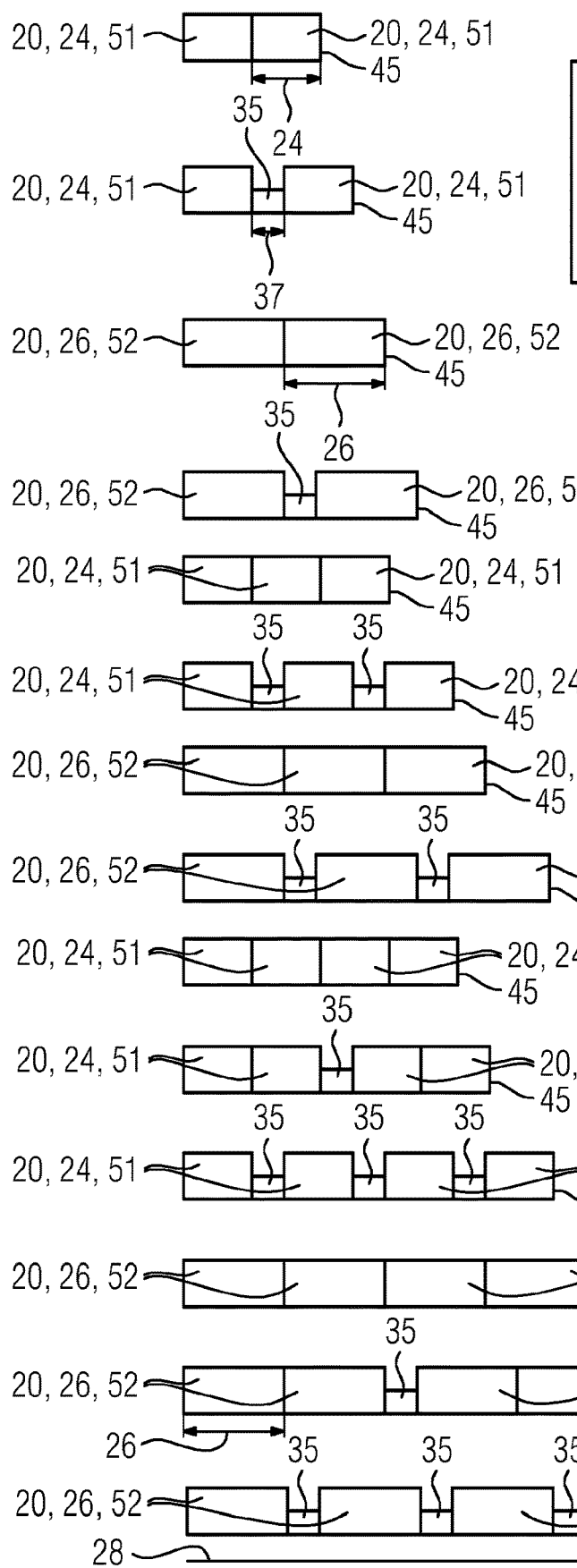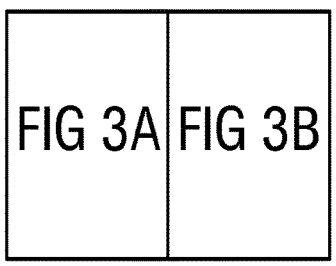

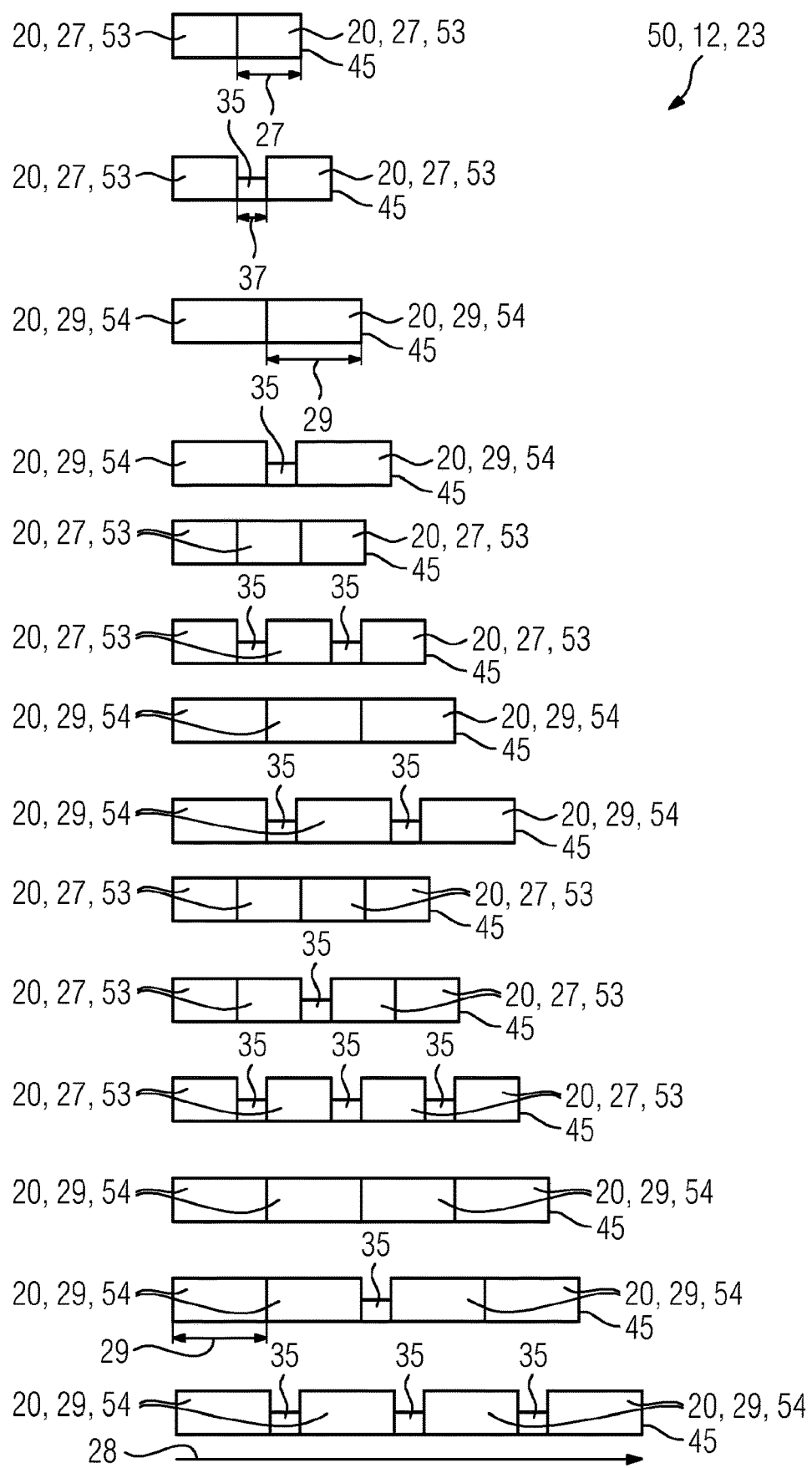

FIG 4
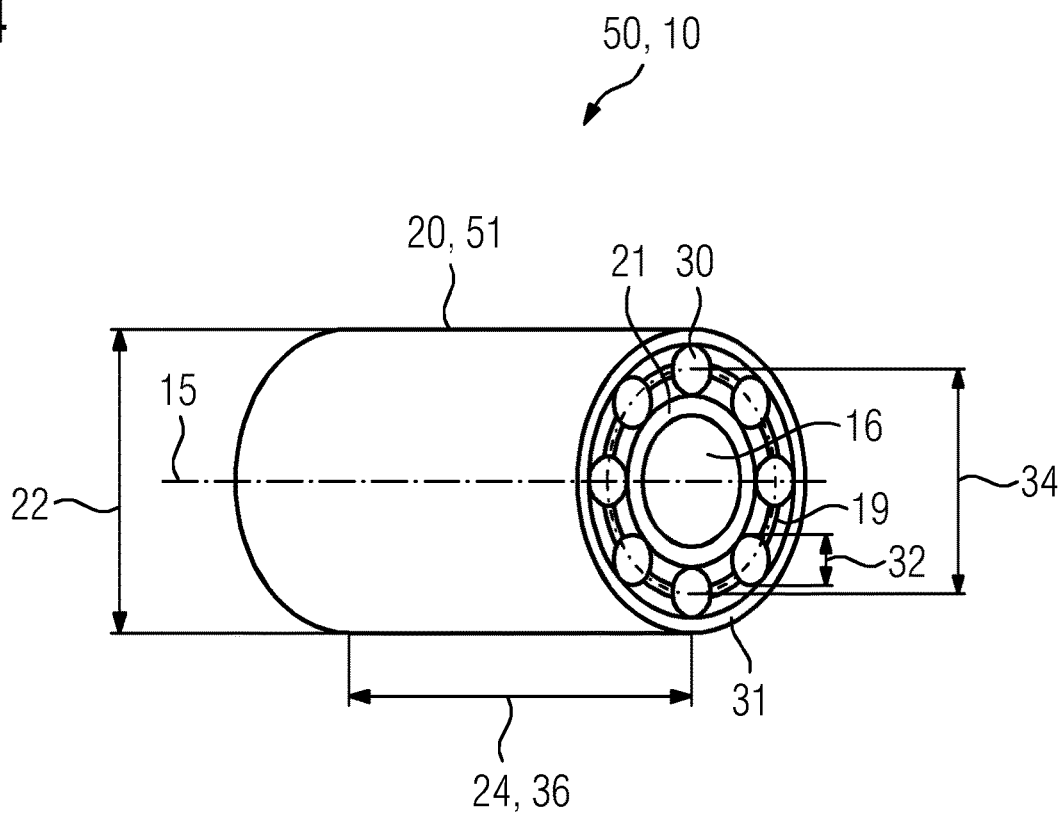
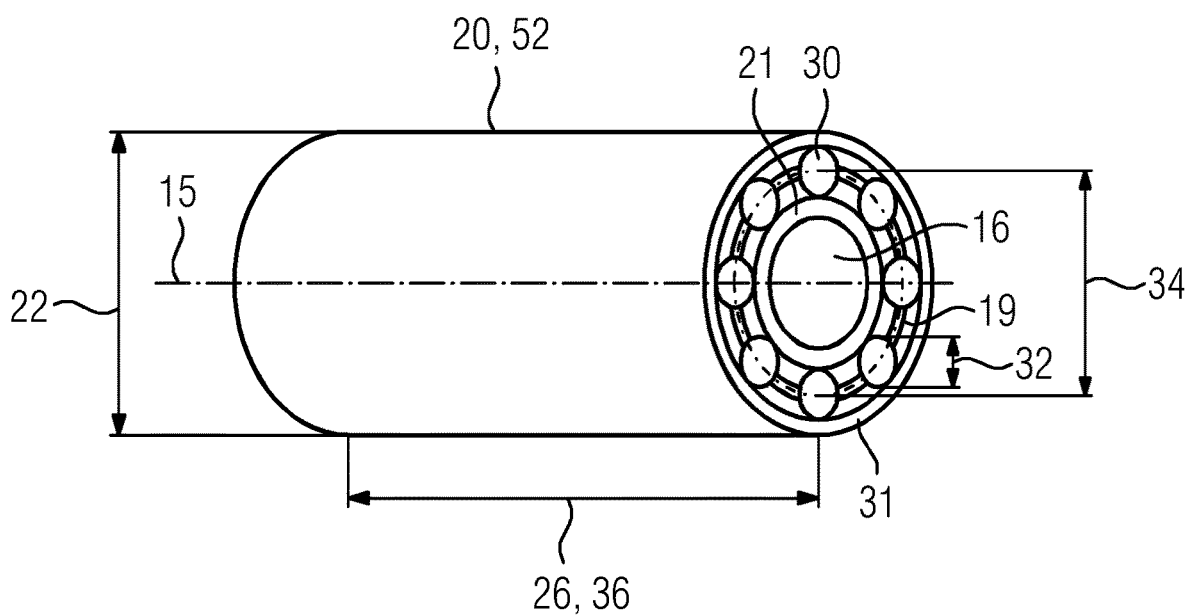

SERIES OF PLANETARY GEARBOXES, WIND TURBINE, INDUSTRIAL APPLICATION, AND USE OF ROLLING BEARINGS

CROSS-REFERENCES TO RELATED APPLICATIONS

This application is the U.S. National Stage of International Application No. PCT/EP2020/071363, filed Jul. 29, 2020, which designated the United States and has been published as International Publication No, WO 2021/052665 A1 and which claims the priority of European Patent Application, Serial No. 19197771.9, filed Sep. 17, 2019, pursuant to 35 U.S.C, 119(a)-(d).

BACKGROUND OF THE INVENTION

The invention relates to a series of planetary gearboxes which are suitable for use in wind turbines or industrial applications. The invention also relates to a drive train for a wind turbine with a planetary gearbox from such a series and to a correspondingly equipped wind turbine. The invention also relates to an industrial application which is fitted with a corresponding planetary gearbox. The invention moreover relates to the use of rolling bearings in planetary gearboxes.

The document WO 2018/141715 A1 discloses a series of gearboxes which comprises a plurality of different multi-stage planetary gearboxes. Structurally identical planet carriers are used for a plurality of planetary gearboxes. Planetary gears of different widths are used here for different planetary gearboxes.

DE 36 07 729 A1 discloses a rolling bearing which is used for working rolls in high-speed rolling mills. The rolling bearing comprises two single-row cylindrical roller bearings between which an oblique rolling bearing is arranged.

The document WO 20091059585 A2 discloses an arrangement for mounting a planetary gear in a planetary gearbox, in which three rolling elements are arranged on an inner ring, axially one behind the other. The planetary gear is here arranged on the rolling elements arranged axially one behind the other.

The document EP 3 351 830 B1 discloses a multi-stage planetary gearbox in which a planetary gear carrier is arranged in each of the two planetary stages. A plurality of planetary gears are arranged rotatably on each of the planetary gear carriers. The planetary gears are arranged on the planetary gear bolts on a plurality of planetary gear bearings arranged one behind the other. The planetary gear bearings are here designed as plain bearings.

Planetary gearboxes are used in different technical fields and ever greater demands are being placed on them in terms of performance and economy. There is therefore a need for durable planetary gearboxes which can be produced simply and cost-effectively. The object of the invention is to provide an option for meeting the demands described in an advantageous fashion.

SUMMARY OF THE INVENTION

The object is achieved by the series of planetary gearboxes according to the invention, which comprises a plurality of subseries of planetary gearboxes which each have multiple types.

A series is to be understood here as a plurality of planetary gearboxes which serve the same purpose and/or are based on the same basic structural design.

For example, a series can be a plurality of gearboxes for wind turbines which are designed with different sizes. Each subseries comprises a planetary gear carrier of at least one planetary stage on which at least one planetary gear is rotatably mounted. The planetary gear carrier accordingly has at least one planetary gear bolt. Moreover, in each subseries the at least one planetary gear is mounted on at least two rolling bearings. For this purpose, the rolling bearings can be designed as ball bearings, cylindrical roller bearings, needle bearings, taper roller bearings, or the like. The at least two rolling bearings to which the planetary gear is attached are arranged axially one behind the other. The term "axially" here refers to a direction along a planetary gear axis of rotation.

According to the invention, the at least two rolling bearings in a first subseries of planetary gearboxes have a first bearing width. Correspondingly, the at least two rolling bearings in a second subseries of planetary gearboxes all have a second bearing width. By combining rolling bearings with the same bearing width, a desired overall bearing width can be set for the planetary gear, which ensures that the planetary gear is carried optimally. The number of components used in the series according to the invention is reduced by the use of rolling bearings with the same bearing width. The principle of using the same parts is consequently applied, which enables the particularly simple, quick, and cost-effective production of different subseries, and accordingly of a large number of types of planetary gearboxes. In particular, the structural design of bearing assemblies with a plurality of rolling bearings can thus also be simplified and a wide range of combinations of rolling bearings configured quickly. Almost any desired overall bearing width can be realized by a combination of two or more rolling bearings. Because the first and second bearing widths are different, an incremental graduation can be created over the subseries by the choice of appropriate bearing widths between individual types of planetary gearbox. In particular, with a reduced number of parts it is possible to adapt a planetary gearbox to stresses of different magnitude and at the same time to speed up their production. Symmetrical arrangements of rolling bearings can furthermore be obtained, viewed in an axial direction.

In a further embodiment of the claimed series of planetary gearboxes, the rolling bearings with the first and second bearing width, i.e. the rolling bearings in the first and second subseries of planetary gearboxes, have a first external diameter. Such a common external diameter makes it possible to use the rolling bearings for mounting a planetary gear with a hub bore with a constant diameter. This makes it possible to use a planetary gear in each case for all subseries of the series, in which there is no need for special adaptations to the hub, in particular stepped bores. As a result, planetary gearboxes according to the claimed series can also be produced simply.

A spacer element can furthermore be arranged in the claimed series between in each case two rolling bearings. The spacer element can, for example, be designed as a distance ring which can be pushed onto the planetary gear bolt. The overall bearing width at the at least two rolling bearings can be further set by the spacer element. A supporting width for the planetary gear can consequently also be enlarged. Two rolling bearings can be positioned in such a way that they are axially flush with a hub of the planetary gear. In the claimed series, a spacer element which is standardized in terms of its axial length can be used. Thus, the obtainable number of possible overall bearing widths can be significantly increased in the series with just one additional type of component. Alternatively, the series can also comprise subseries or types of planetary gearboxes which have spacer elements with different axial lengths. Accordingly, the claimed series can be adapted simply to new structural requirements.

The rolling bearings can furthermore be designed in a single row. Single-row rolling bearings have a reduced bearing width such that in the claimed series at least two rolling bearings need to be used at all times at a planetary gear. Accordingly, more than two rolling bearings can also be used at a planetary gear and overall bearing widths which are increased incrementally can thus be obtained. As a result, a modular design principle is essentially applied for the rolling bearings of the planetary gear. Accordingly, increased quantities of the same rolling bearings are required in the claimed series, which in turn enables economies of scale in procurement. The economy of the claimed series is further increased as a result. Single-row rolling bearings can furthermore be calculated simply as part of the design, which simplifies upgrading of the series to increased numbers of rolling bearings. Alternatively, the rolling bearings can also have a multiple-row design.

Moreover, in the claimed series of planetary gearboxes, the second bearing width can essentially correspond to 1.1 to 1.5 times the first bearing width. Particularly preferably, the second bearing width can essentially correspond to 1.3 to 1.4 times the first bearing width. Such a combination of bearing widths makes it possible to obtain an incremental graduation of overall bearing widths by respectively combining the same rolling bearings in the subseries in the series. Whole-number multiples of the first bearing width can thus be set as the overall width in the first subseries. For a corresponding second bearing width, types can thus be provided for the first subseries which have intermediate values with respect to the first subseries. As a result, a wide spectrum of possible overall bearing widths can be provided with a minimal number of different components.

In the claimed series of planetary gearboxes, the spacer element, which can be positioned between two rolling bearings, can have an axial length which essentially corresponds to 0.1 to 0.2 times. The axial length is here understood to be the dimension of the spacer element by which the spacing between two rolling bearings is fixed when the spacer element is positioned there. In the case of an annular spacer element, this is, for example, the thickness of the ring. Further intermediate values can be defined within the first and second subseries by an axial length which corresponds to 0.1 to 0.2 times the first axial width. Consequently, by adding just one further type of component, the variety of possible combinations of rolling bearings in the subseries is further increased.

In a further embodiment of the claimed series, it can also comprise subseries in which the rolling bearings have a second external diameter which differs from the first external diameter. In a third subseries, the rolling bearings all have a third bearing width. In a fourth subseries, the rolling bearings similarly all have a fourth bearing width. The principle of the claimed series which is applied in the first and second subseries can be transferred simply to subseries with different external diameters too. The claimed series can thus be readily scaled, which makes it possible to simplify a wide range of planetary gearboxes. The possibility is consequently provided of making the production of planetary gearboxes more cost-efficient.

In a development of the claimed solution, the rolling elements with the first and the second external diameter can have rolling elements which have the same rolling element diameter. Alternatively or additionally, the rolling elements in the rolling bearings with the first and second external diameter can have the same rolling element length, i.e. the same dimensions in the axial direction. This makes it possible to further standardize the production of rolling elements at the rolling bearings used in the claimed series. The principle of using the same parts is thus applied not only in the combination of rolling bearings but also in the production of the rolling bearings themselves. In particular, with the same rolling element diameters and rolling element lengths, identical rolling elements can be used in the rolling bearings of a plurality of subseries.

The rolling bearings with the first and the second bearing width can furthermore have the same number of rolling elements, and have rolling elements with the same rolling element diameters and/or the same pitch circle diameters. The production of rolling elements for the different rolling bearings is also further standardized as a result and hence made more economic. In particular, the structural design of the rolling bearings is thus simplified and hence made faster. For example, rolling bearings with the first and second bearing width can thus be produced which are based on the same structure and differ only in their bearing width.

Moreover, in the claimed series, the bearing width can be the same as that used in the first subseries and the third bearing width the same as that used in the third subseries. Alternatively or additionally, the second bearing width can be the same as that used in the second subseries and the fourth bearing width can be the same as that used in the fourth subseries. Consequently, the existing bearing widths over a plurality of subseries can correspond with each other. A desired overall bearing width can consequently be set by means of a similar combination of rolling bearings in subseries with a different external diameter. This further simplifies the handling of the claimed series. In particular, knowledge, for example, of a sequence of combinations of rolling bearings and possibly spacer elements of a single external diameter with an increasing overall bearing width is sufficient to combine the same variety of possible overall bearing widths with rolling bearings with any desired external diameter. The claimed series therefore has a reduced susceptibility to faults, which makes the production of the corresponding planetary gearbox even faster and more reliable.

Moreover, in the claimed series, spacer elements with different axial lengths can also be used and thus a further increased number of possible overall bearing widths can be set. Spacer elements such as, for example, rings can be produced and adapted simply. The outlined multiplicity of possible overall widths is consequently obtained in a particularly economic manner. Alternatively or additionally, a plurality of spacer elements with the same or different axial length can also be positioned between two rolling bearings. The advantages outlined above of the claimed solution are thus realized to an increased extent.

In a further embodiment or the claimed series, the planet carrier of a first planetary stage is equipped with rolling bearings within the sense of the claimed series. A second planetary stage of the planetary gearbox, which is arranged after the first planetary stage, can moreover also be equipped with rolling bearings for the planetary gears which are designed in arrangements according to one of the above described embodiments. The principle of the outlined series can be transferred simply in the case of multi-stage planetary gearboxes to each of the planetary stages. The production of particularly complex planetary gearboxes with multiple stages and which in the prior art involved a correspondingly high number of components is further simplified as a result.

The above described object is also achieved by a drive train according to the invention for a wind turbine. The drive train comprises a rotor shaft which can be coupled to a rotor of a wind turbine. The drive train also comprises a gearbox which is connected to the rotor shaft so that it can transmit torque. The gearbox is in turn coupled, so that it can transmit torque, to a generator which is also part of the drive train. According to the invention, the gearbox in the drive train is designed as a planetary gearbox. The planetary gearbox is here a planetary gearbox from a series according to the embodiments outlined above. The embodiments of the claimed series make it possible to provide planetary gearboxes simply and cost-effectively. The planetary gearboxes can here be adapted, for example, to different rotor shaft torques and/or generator input speeds by an appropriate selection from the series. Flexible combinations of different generators and different rotor shaft torques are made possible by means of the claimed series of planetary gearboxes. The claimed drive train can consequently be adapted quickly and economically to a wide range of wind turbines.

The outlined object is likewise achieved by a wind turbine according to the invention. The wind turbine comprises a rotor which is attached rotatably to a nacelle. When mounted, the rotor is connected to a rotor shaft which is part of a drive train. The drive train is accommodated in the nacelle and designed to generate electricity from the rotation of the rotor. According to the invention, the drive train is designed according to one of the above-described embodiments. The drive train according to the invention thus makes it possible to use the technical advantages of the above-described series of planetary gearboxes in wind turbines.

The object described is also achieved by an industrial application according to the invention. The industrial application comprises a drive unit which can be designed, for example, as an electric motor, a combustion motor, or a hydraulic motor. The drive unit supplies drive power which is imparted to a gearbox via a connection which transmits torque. The gearbox is in turn connected, so that it can transmit torque, to a driven unit for which the drive power is supplied. The driven unit can be designed as a mechanical application, for example as a mill, vertical mill, sugar mill, cement mill, rock crusher, conveyor belt, pump, roller press, slat conveyor, tube mill, rotary kiln, vertical boring and turning mill, stirring machine, lifting device, garbage compactor, or scrap metal compactor. According to the invention, the gearbox can be designed as a planetary gearbox from a series according to one of the embodiments outlined above. The technical advantages of the series according to the invention are obtained in particular when applied to an industrial application.

The object outlined is also achieved by the use according to the invention of rolling bearings. The rolling bearings are used in a planetary gearbox for rotatably mounting planetary gears in a planetary gearbox. According to the invention, the rolling bearings are designed in a single row and are combined for each planetary gear, i.e. are not used individually to mount the respective planetary gear. The rolling bearings have the same external diameter and all have the same bearing width. Essentially interchangeable rolling bearings are thus used. At least two rolling bearings are used for each planetary gear in order thus to obtain modularly a desired overall bearing width at the planetary gear. An adapted arrangement of rolling bearings can consequently be provided simply and economically for the planetary gear.

BRIEF DESCRIPTION OF THE DRAWING

The invention is explained in detail below in the drawings with the aid of individual embodiments. The drawings are to be interpreted in a complementary fashion such that the same reference symbols have the same technical meaning in different drawings. The features of the individual embodiments can also be combined with one another. The embodiments shown in the drawings can moreover be combined with the features outlined above. In the drawings, in detail:

FIG. 3 shows schematically a summary of a second embodiment of the series according to the invention of planetary gearboxes;

FIG. 4 shows a design of rolling bearings according to a third embodiment of the series according to the invention of planetary gearboxes;

DETAILED DESCRIPTION OF PREFERRED EMBODIMENTS

Figure 1:
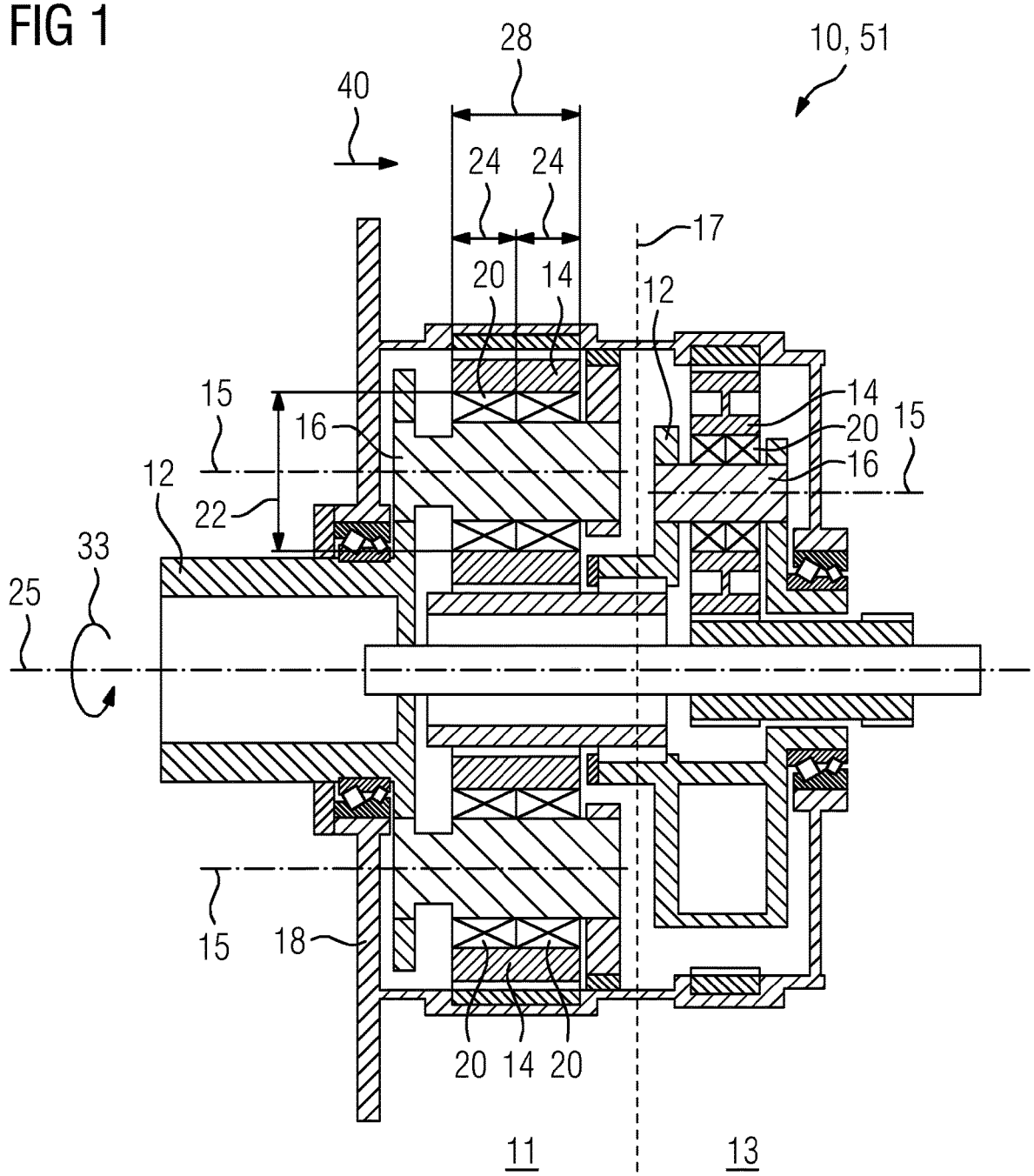
FIG. 1 shows schematically a longitudinal section of a planetary gearbox from a series according to a first embodiment or the series according to the invention.

A longitudinal section of a planetary gearbox 10 with a first and a second planetary stage 11, 13 is illustrated schematically in FIG. 1. The division between the first and the second planetary stage 11, 13 is represented by the dividing line 17. The planetary gearbox 10 is part of a series 50 of planetary gearboxes 10. The series 50 is here designed according to a first embodiment of the present invention. Within the series 50, the planetary gearbox 10 according to FIG. 1 is part of a first subseries 51. The planetary stages 11, 13 each have a planetary gear carrier 12 which can rotate about a main axis of rotation 25 of the planetary gearbox 10. Drive power 33 is supplied via the planetary gear carrier 12 of the first planetary stage 11. The planet carrier 12 of the first planetary stage 11 has a plurality of planetary gear bolts 16 on which in each case a planetary gear 14 is arranged so that it can rotate about a planetary gear axis 15. Similarly, planetary gears 14 are also attached to planetary gear bolts 16 of the planetary gear carrier 12 of the second planetary stage 13. The planetary gears 14 in the first and second planetary stage 11, 13 are each arranged on two rolling bearings 20 arranged one behind the other. An axial direction is indicated in FIG. 1 by an arrow 40. The rolling bearings 20 at the planetary gear carrier 12 of the first planetary stage 11 both have a first external diameter 22 by means of which the planetary gear 14 can be pushed simply onto the rolling bearings 20 during assembly. The rolling bearings 20 moreover each have a first bearing width 24 on the planet carrier 12 of the first planetary stage 11. The arrangement of the rolling bearings 20 results in an overall bearing width 28, which corresponds to twice the first bearing width 24, at a planetary gear bolt 16. The rolling bearings 20 at the planetary gear bolts 18 of the first planetary stage 11 have a single-row design and essentially the same structure, i.e. are interchangeable. The planetary gears 14 in the first planetary stage 11 are thus held on a plurality of rolling bearings 20 which are structurally identical or at least of the same type. The principle of using the same parts is consequently applied.

Figure 2:
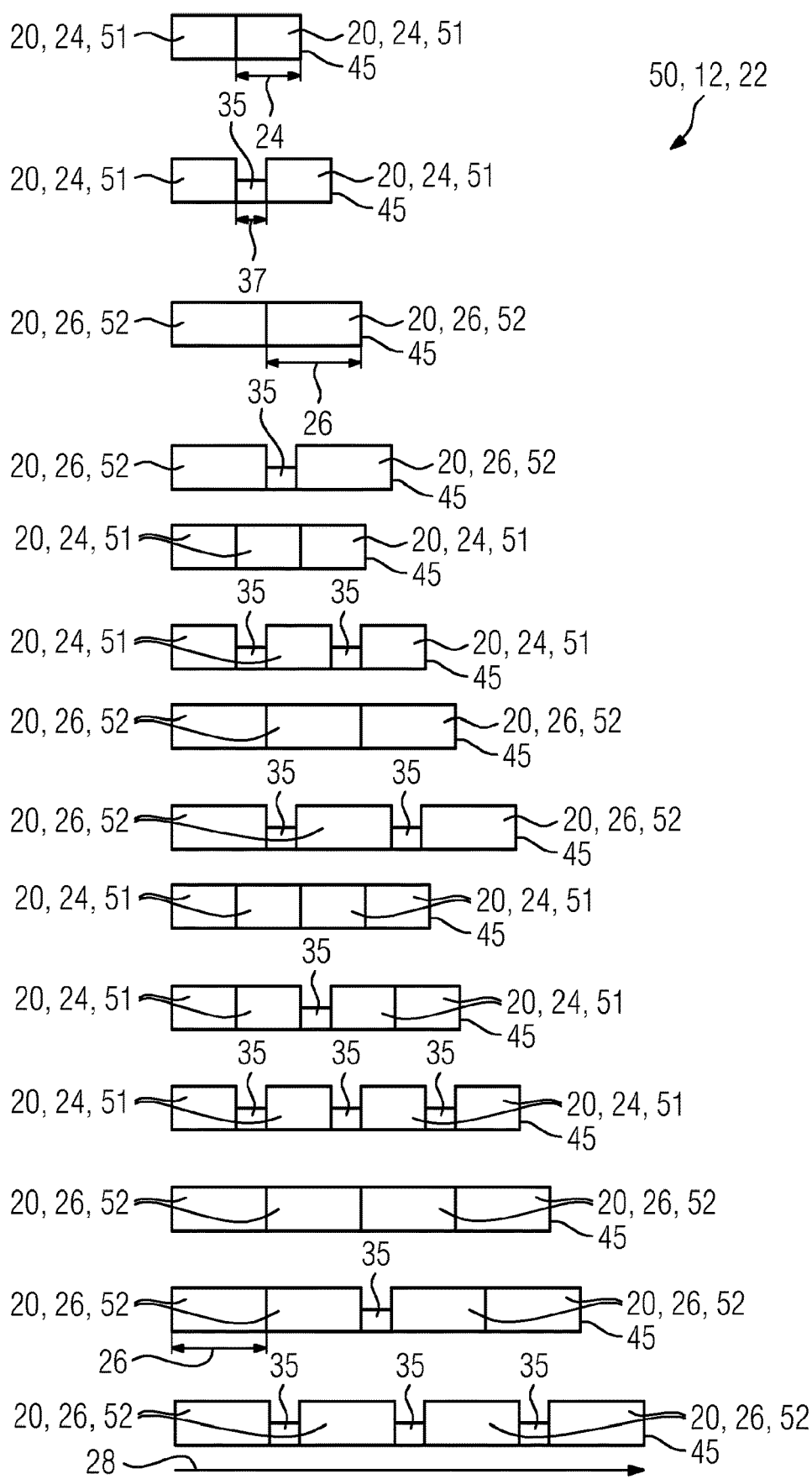
FIG. 2 shows schematically a summary of the first embodiment of the series according to the invention of planetary gearboxes.

A schematic summary of the series 50 according to the first embodiment of the invention is represented in FIG. 2. The series 50 comprises a plurality of types 45 which are part of a first or a second subseries 51, 52. For each type 45 there is a different combination of rolling bearings 20 and spacer elements 35 which are used for each planetary gear bolt 16 in a planetary gear carrier 12 of a planetary stage 11, 13. The rolling bearings 20 of the series 50 according to FIG. 2 all have a first external diameter 22. FIG. 2 shows the arrangement of the rolling bearings 20, arranged vertically one under the other, for each type in a half-section. The overall bearing width 28 of each type 45 is illustrated horizontally. The first subseries 51 comprises a plurality of types 45 in which in each case at least two rolling bearings 20 are used with the first bearing width 24. In some types 45, spacer elements 35 which can be designed as rings are arranged between rolling bearings 20 with the first bearing width 24. The spacer elements 35 each have the same axial length 37 in the types 45 of the first and second subseries 51, 52. The overall bearing width 28, i.e. the total of the bearing widths 24, 26 and axial lengths 37 of spacer elements 35 can be set for each type 45 by means of the spacer elements 35.

Rolling bearings 20 which all have a second bearing width 26 are used in the types 45 of the second subseries 52. Similarly to the first subseries 51, some types 45 of the second subseries 52 have spacer elements 35 which are arranged between the rolling bearings 20. The second bearing width 26 here corresponds to 1.2 times the first bearing width 24. A large number of types 45 can be produced by the interaction of the first and second bearing width 24, 26 and the spacer elements 35. The series 50 according to FIG. 1 shows, by way of example, 14 types 45 which each have a different overall bearing width 28 but here are based on just three different types of component. This makes it possible simply, by combining structurally identical rolling bearings 20 and depending on the type 45, also spacer elements 45. An incrementally graduated series 50 of possible arrangements of rolling bearings 20 is provided as a result. In the series 50 illustrated, a planetary gear carrier 12 can thus be adapted to planetary gears 14 of different widths and affords an optimized load-bearing capacity for the latter. At the same time, the individual types 45 can be mounted simply such that the production of planetary gearboxes 10 according to the series 50 takes place reliably. In addition, a high degree of economy can be obtained by the principle of using the same parts.

FIG. 3 shows schematically a summary of a second embodiment of the claimed series 50. As illustrated on the left in FIG. 3, the series 50 has a first and a second subseries 51, 52, as also represented in FIG. 2. The series 50 furthermore comprises a third and a fourth subseries 53, 54 which is illustrated on the right in FIG. 3. The rolling bearings 20 of the third and fourth subseries 53, 54 all have a third and fourth bearing width 37, respectively. The third and fourth subseries 53, 54 also have types 45 in which spacer elements 35, which each have an axial length 37 which is identical to the axial length 37 of the spacer elements 35 which are also used in the first and second subseries, are arranged between rolling bearings 20. The principle of using the same parts consequently applied in the first, second, third, and fourth. Furthermore, the third bearing width 37 in the third subseries 53 corresponds to the first bearing width 24 in the first subseries 51. The fourth bearing width 29 in the fourth subseries 54 corresponds to the second bearing width 26 in the second subseries 52.

The third and fourth subseries 53, 54 contrast with the first and second subseries 51, 52 in terms of the external diameter. The rolling bearings 20 of the third and fourth subseries 53, 54 have a second external diameter 23 which differs from the first external diameter 22 from the first and second subseries 51, 52. Accordingly, combinations of rolling bearings 20 and possibly spacer elements 35 which are horizontally opposite one another in FIG. 3 have the same overall bearing width 28. The principle of the first and second subseries 51, 52 can thus be transferred simply to different external diameters 22, 23. Arrangements of rolling bearings 20, 23 with different external diameters 22, 23 can be combined according to a standard system to create a desired overall bearing width 28. Because of the greater use of the same parts, an increased number of possible arrangements of rolling bearings 20 can be provided cost-effectively for planetary gearboxes 10 with a minimum number of additional components. Because of the reduced number of additional components, the series 50 according to FIG. 3 has a reduced susceptibility to faults during assembly and can therefore be integrated reliably into a production process. The principle according to FIG. 3 can be readily transferred to further subseries.

The design of rolling bearings 20 which are designed in a first and a second subseries 51, 52 according to a third embodiment of the claimed series 50 is illustrated in FIG. 4. The rolling bearings 20 are here used in planetary gearboxes 10 such as those shown, for example, in FIG. 1. The rolling bearings 20 each comprise an inner ring 21 and an outer ring 31 which can be rotated relative to each other about a planetary gear axis 15. The rolling bearings 20 moreover comprise cages 19. The inner rings 21 are designed in such a way that they can be attached to a planetary gear axle 16 (not illustrated in more detail). Rolling elements 30, which are designed as cylindrical rollers or needles, are arranged between the outer ring 31 and the inner ring 16. The rolling elements 30 accordingly have a rolling element length 36 which essentially corresponds to the first and second bearing width 24, 26. The rolling bearings 20 of the first subseries 51 have a first bearing width 26 and the rolling bearings 20 of the second subseries 52 have a second bearing width 26. The rolling bearings 20 of the first and second subseries 51, 52 moreover have a common first external diameter 22. The rolling elements 30 in the rolling bearings 20 of the first subseries 51 have the same rolling element diameter 32 as the rolling elements 30 in the rolling bearings 20 of the second subseries 52. The number of rolling elements 30 in the rolling bearings 20 of the first subseries 51 furthermore corresponds to the number of rolling elements 30 in rolling bearings 20 of the second subseries 52. The rolling bearings 20 of the first and second subseries 51, 52 also have a common, i.e. the same, pitch circle diameter 34. The pitch circle diameter 34 corresponds, relative to the planetary gear axis 15, to the diameter of the circle on which the center points of the rolling elements 30 lie. The rolling bearings 20 of the second subseries 52 can be understood as a whole to be extended rolling bearings 20 of the first subseries. The rolling bearings 20 can as a whole thus be produced simply and cost-effectively.

Figure 5:
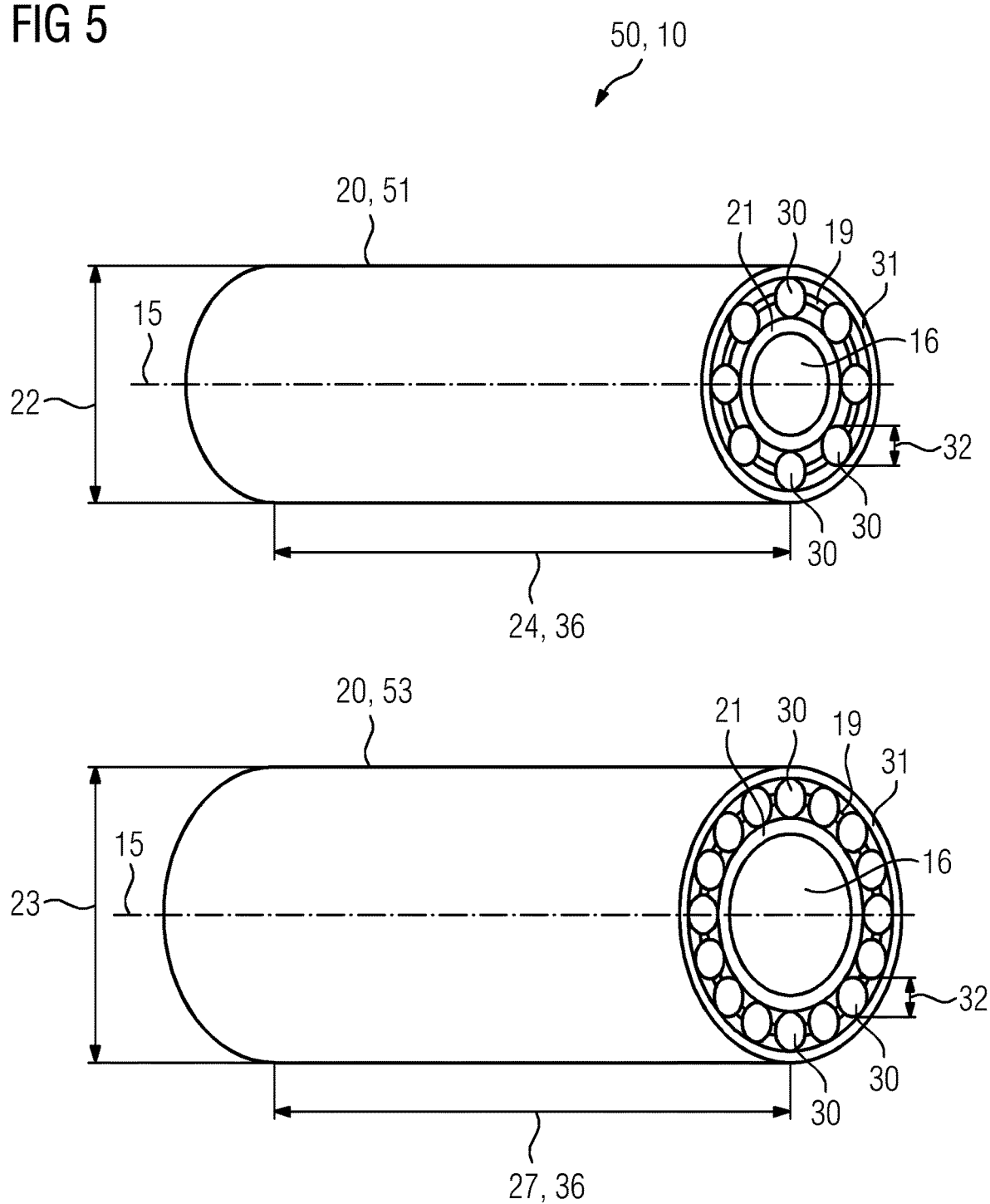
FIG. 5 shows a design of rolling bearings according to a fourth embodiment of the series according to the invention of planetary gearboxes.

FIG. 5 furthermore shows rolling bearings 20 which are part of a fourth embodiment of the claimed series 50 of planetary gearboxes 10. The rolling bearings 20 are part of a first and third subseries 51, 53. The rolling bearings 20 each have an inner ring 21 and an outer ring 31 between which rolling elements 30 are in each case arranged. The inner ring 21 and the outer ring 31 can rotate in the rolling bearings 20 relative to each other about a planetary gear axis 15. The inner rings are designed in such a way that they can be attached to a planetary gear bolt 16 (not shown in more detail) The rolling bearings 20 moreover comprise cages 19.

The rolling bearings 20 have a first and third bearing width 24, 27 which are the same. The rolling bearings 20 of the first and third subseries 51, 53 thus contribute in an arrangement of rolling bearings 20 to the corresponding overall bearing width 28 by the same amount. The first and third bearing width 24, 27 correspond essentially to a rolling element length 36 of the rolling elements 30 in the rolling bearings 20. The rolling element lengths 36 in the first and third subseries 51, 53 are accordingly the same. The rolling elements 30 are designed as cylindrical rollers or needles and have the same rolling element diameter 32 in the first and third subseries 51, 53. The rolling bearings 20 of the first subseries 51 have a first external diameter 22 which is smaller than a second external diameter 23 of the rolling bearings 20 from the third subseries 53. Accordingly, the rolling bearing 20 of the third subseries 53 has a higher number of rolling elements 30 than the rolling bearing 20 of the first subseries 51 which corresponds to it in terms of bearing width 24, 27. The rolling elements 30 of the first and third subseries 53 are accordingly interchangeable. The manufacture of the rolling bearings 20 for the first and second subseries 51, 53 is also simplified by this application of the principle of using the same parts, which makes the series 50 of planetary gearboxes 10 even more economic.

Figure 6:
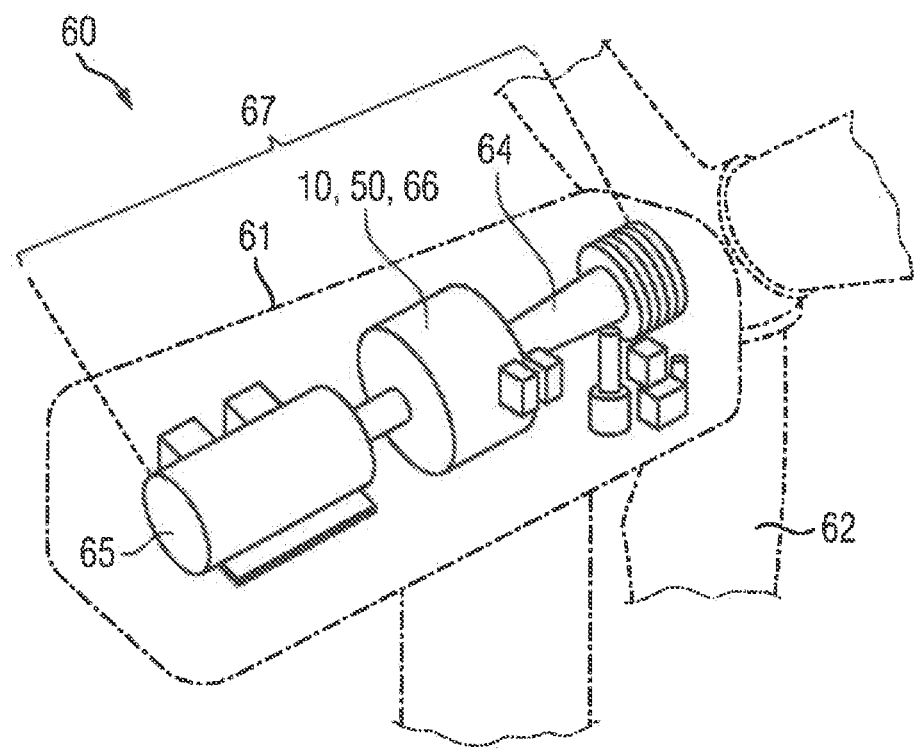
FIG. 6 shows a cut-away view from an angle of an embodiment of the wind turbine according to the invention.

An embodiment of a claimed wind turbine 60 is moreover illustrated in FIG. 6. The wind turbine 60 has a rotor 62 which is rotatably attached to a nacelle 61. The rotor 62 is connected to a rotor shaft 64 by means of which a generator 65 is driven via a gearbox 66. The rotor shaft 64, the gearbox 10, and the generator 65 are part of a drive train 67, accommodated in the nacelle 61, of the wind turbine 60. The gearbox 66 is a planetary gearbox 10 from a series 50 according to one of the above described embodiments. The planetary gearbox 10 from a claimed series 50 can be produced quickly and simply, as a result of which the drive train 67 and the wind turbine 60 are in turn more economic.

Figure 7:
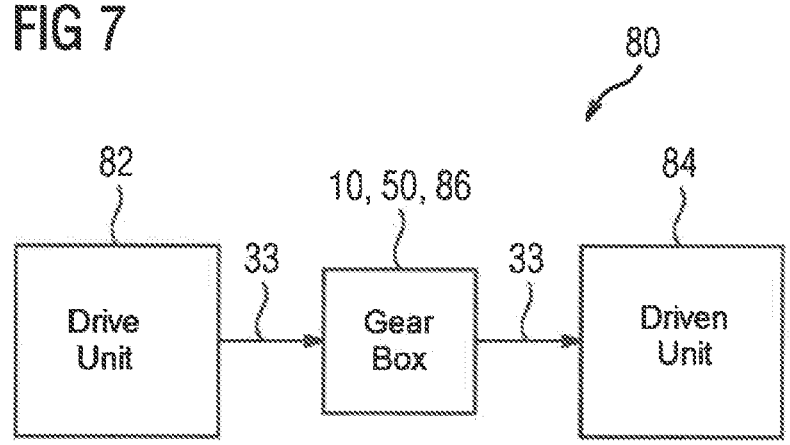
FIG. 7 shows a schematic design of an embodiment of the industrial application according to the invention.

FIG. 7 shows schematically the design of a claimed industrial application 80 which has a drive unit 82 and a driven unit 84 which are interconnected so that they can transmit torque via a gearbox 86. The drive unit 82 is designed to provide drive power 33 which is required for the operation of the driven unit 84. The drive unit 82 is for this purpose designed, for example, as an electric motor, a combustion motor, or a hydraulic motor. The driven unit 84 is designed as a mechanical application. The driven unit 84 is accordingly designed such that the industrial application 80 is, for example, a mill, vertical mill, sugar mill, cement mill, rock crusher, conveyor belt, pump, roller press, slat conveyor, tube mill, rotary kiln, vertical boring and turning mill, stirring machine, lifting device, garbage compactor, or scrap metal compactor. The gearbox 86 is here designed as a planetary gearbox 10 from a series 50 according to one of the embodiments outlined above. The claimed series 50 makes it possible to produce suitable planetary gearboxes 10 of different power classes cost-efficiently and quickly. The claimed industrial application 80 is more economic as a result.

The invention claimed is:

1. A series of planetary gearboxes, comprising
a first plurality of subseries of planetary gearboxes including
    a planetary gear carrier of a planetary stage, at least two rolling bearings, and a planetary gear mounted on the at least two rolling bearings, said at least two rolling bearings in a first one of the first plurality of subseries having a first bearing width and in a second one of the first plurality of subseries having a second bearing width, and
    a spacer element arranged between the at least two rolling bearings and configured to adjust a total bearing width of the at least two rolling bearings, wherein the spacer element has an axial length which corresponds to 0.1 to 0.2 times the first bearing width.

2. The series of planetary gearboxes of claim 1, wherein the at least two rolling bearings with the first bearing width and the at least two rolling bearings with the second bearing width have a first external diameter.

3. The series of planetary gearboxes of claim 1, wherein the plurality of subseries includes spacer elements of different axial length arranged between the at least two rolling bearings.

4. The series of planetary gearboxes of claim 1, wherein the at least two rolling bearings have a single-row design.

5. The series of planetary gearboxes of claim 1, wherein the second bearing width corresponds to 1.1 to 1.5 times the first bearing width.

6. The series of planetary gearboxes of claim 1, further comprising a second plurality of subseries of planetary gearboxes, each of the second plurality of subseries of planetary gearboxes including at least two rolling bearings, said at least two rolling bearings in a first one of the second plurality of subseries having a third bearing width and in a second one of the second plurality of subseries having a fourth bearing width, wherein the at least two rolling bearings with the third bearing width or the at least two rolling bearings with the fourth bearing width have a second external diameter.

7. The series of planetary gearboxes of claim 1, wherein the rolling bearings with the first external diameter and the rolling bearings with the second external diameter include rolling elements with a same rolling element diameter and/or a same rolling element length.

8. The series of planetary gearboxes of claim 1, wherein the rolling bearings with the first and second bearing widths have rolling elements with a same rolling element diameter, a same number of rolling elements, or a same pitch circle diameter.

9. The series of planetary gearboxes of claim 6, wherein the first bearing width corresponds to the third bearing width or the second bearing width corresponds to the fourth bearing width.

10. A drive train for a wind turbine, said drive train comprising:
    a generator;
    a rotor shaft; and
    a gearbox configured to couple the rotor shaft to the generator such as to transmit torque to the generator, said gearbox being designed as a planetary gearbox from a series of planetary gearboxes as set forth in claim 1.

11. A wind turbine, comprising:
    a nacelle;
    a drive train accommodated in the nacelle and comprising a generator, a rotor shaft, and a gearbox configured to couple the rotor shaft to the generator such as to transmit torque to the generator, said gearbox being designed as a planetary gearbox from a series of planetary gearboxes as set forth in claim 1; and a rotor attached rotatably to the nacelle and connected to the rotor shaft of the drive train.

12. An industrial application, comprising:

a drive unit;

a driven unit; and a gearbox configured to connect the drive unit to the driven unit such as to transmit torque to the driven unit, said gearbox being designed as a planetary gearbox from a series of planetary gearboxes as set forth in claim 1.

\* \* \* \* \*